(12) United States Patent
Shushtarian

(10) Patent No.: US 12,327,393 B2
(45) Date of Patent: Jun. 10, 2025

(54) SYSTEM AND METHOD FOR CAPTURING CONSISTENT STANDARDIZED PHOTOGRAPHS AND USING PHOTOGRAPHS FOR CATEGORIZING PRODUCTS

(71) Applicant: Standard Stone, Inc., Houston, TX (US)

(72) Inventor: Arash Shushtarian, Houston, TX (US)

(73) Assignee: Standard Stone, Inc., Houston, TX (US)

( * ) Notice: Subject to any disclaimer, the term of this patent is extended or adjusted under 35 U.S.C. 154(b) by 441 days.

(21) Appl. No.: 17/573,634

(22) Filed: Jan. 12, 2022

(65) Prior Publication Data

US 2023/0222766 A1    Jul. 13, 2023

(51) Int. Cl.
| | |
|---|---|
| *G06Q 10/087* | (2023.01) |
| *G06Q 30/0601* | (2023.01) |
| *G06Q 30/0645* | (2023.01) |
| *G06T 11/20* | (2006.01) |
| *G06V 10/764* | (2022.01) |

(52) U.S. Cl.
CPC ......... *G06V 10/764* (2022.01); *G06Q 10/087* (2013.01); *G06Q 30/0633* (2013.01); *G06T 11/206* (2013.01)

(58) Field of Classification Search
CPC .. G06V 10/764; G06V 10/56; G06V 2201/06; G06Q 10/087; G06Q 30/0633; G06T 11/206; H04N 1/02815; H04N 1/02845; H04N 1/02865; H04N 1/02895
See application file for complete search history.

(56) References Cited

U.S. PATENT DOCUMENTS

| | | | |
|---|---|---|---|
| 10,671,856 B1 * | 6/2020 | Ren | G06Q 10/087 |
| 11,335,153 B1 * | 5/2022 | Finley | G06N 3/08 |
| 2001/0042024 A1 | 11/2001 | Rogers | |
| 2008/0147506 A1 | 6/2008 | Ling | |
| 2021/0164160 A1 * | 6/2021 | Forester | D21G 9/0027 |
| 2021/0304396 A1 | 9/2021 | Addington et al. | |
| 2021/0319548 A1 | 10/2021 | Bolton et al. | |
| 2022/0196565 A1 * | 6/2022 | Luo | G01N 21/8806 |

FOREIGN PATENT DOCUMENTS

| | | | | |
|---|---|---|---|---|
| CA | 3118313 A1 * | 5/2020 | | G06Q 10/04 |
| CN | 112798108 A * | 5/2021 | | B07C 5/3422 |
| JP | 2021096193 A * | 6/2021 | | |

* cited by examiner

*Primary Examiner* — Michael Jared Walker
*Assistant Examiner* — Matthew S Weronski
(74) *Attorney, Agent, or Firm* — Dana Legal Services; Jubin Dana

(57) ABSTRACT

A system and method are disclosed for ensuring quality photos and categorization of stone products slab, panel, or tile (SPTs). The system photographs or scans each SPT in a consistent and standardized process that controls the camera, lens, lighting, lighting intensity, and distance between these components and the SPT being photographed or scanned. The photos are used to categorize SPTs according to color, color-shade, pattern, and grade. A unique barcode including results from categorization are printed on the SPT, and containers are filled with the same type of SPTs. The system brings uniformity to the containers, thus creating a higher market value. The photos are also used in factory inventory management and e-commerce website for natural stone customers.

19 Claims, 11 Drawing Sheets

SYSTEM AND METHOD FOR CAPTURING CONSISTENT STANDARDIZED PHOTOGRAPHS AND USING PHOTOGRAPHS FOR CATEGORIZING PRODUCTS

FIELD OF THE INVENTION

The invention is in the field of photographing manufacturing materials and, more specifically, related to system and method for capturing photos, sorting, and classifying materials.

BACKGROUND

Natural stones such as marble, travertine, granite, etc., are products of nature. Such stones produced in stone factories varies in color, shades of color, pattern, and grade (quality), even if the raw blocks are from a single quarry. Typically, when a natural stone customer wants to purchase stone, the customer requests photos of the products to see the color and appearance of the stone. This process has a few drawbacks, as photos are taken with regular, uncalibrated, or cell-phone cameras and in varying ambient and environmental conditions, resulting in inconsistent photographs. The camera's setting, ambient lighting, the position of the stone, and numerous other factors are barriers to capturing consistent, and more importantly, True-Color of the product. Since the captured photos are unmatched to the stone color, stone factories apply and modify filters such as brightness, saturation, contrast, Red/Blue/Green alterations, and several other filters to modify photos to their own perception of True-Color or to meet customers' desired color. Lastly, factories cannot provide photographs of every single product. These shortcomings often lead to customer dissatisfaction and potential conflicts when the customers receive the product(s).

Categorizing stone products is another challenge. For example, slabs, panels, or tiles (SPTs) produced from a beige marble quarry will range from light to dark beige, resulting in nonuniform shades of color between SPTs. It is practically impossible to categorize shades of color accurately by naked eye. The colors we see are influenced by ambient light, which varies throughout the day, season, and sunny or cloudy conditions. Even sorting specialists cannot consistently classify the color or shade of color of a single stone product, due to individual visual abilities and sight perception. In addition to these complexities, when SPTs are sorted and piled over one another, color discrepancies are gradually introduced, as the sorting specialist could misremember what the shade-color of the reference piece (first product) of the pallet was. As a result, SPT consignments purchased by customers are mostly mixed in color-shades, and therefore have less value compared to consignments of uniform color, color-shade, pattern, and grade. Because of this difficulty, stone factories are constantly plagued by complaints from customers about installed SPTs not having uniform appearance on floors, walls, or other surfaces.

Therefore, what is needed to solve these problems is a system and method that captures the True-Color of the SPTs in standardized and consistent processes, provides photographs of every product, and reliably categorizes them by distinct color, color-shade, pattern, and grade to eliminate imperfections of categorization by the human eye.

SUMMARY OF THE INVENTION

A system and method are disclosed for capturing a uniform and standard photo of SPTs and categorizing them by color, color-shading, pattern, and grading. The SPTs move through a device at a constant speed and are photographed from a consistent distance, angle, and light intensity with a uniform lens, filter(s), and calibrated camera(s). Uniform photos of the SPTs are obtained and are then fed to the computing machine with a module(s) to perform each categorization. Building materials factories such as natural stone, wood, and ceramics can use this system to sort and inspect their products.

A system and method are disclosed for capturing uniform and standard photos of products in factories and industrial settings. The products move through a device and are photographed from a consistent distance, angle, and light intensity with a uniform lens, filter, and calibrated camera(s).

A system and process are disclosed for categorizing products by color, color-shading, pattern, and grading (quality). The consistent, standardized photographs are fed to the server(s) with a module(s) tasked to perform each categorization. Factories such as natural stone, wood, and ceramics can use this system to sort and inspect their products.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the best mode of the invention are described with additional detail through use of the accompanying drawings.

DETAILED DESCRIPTION

Figure 1:
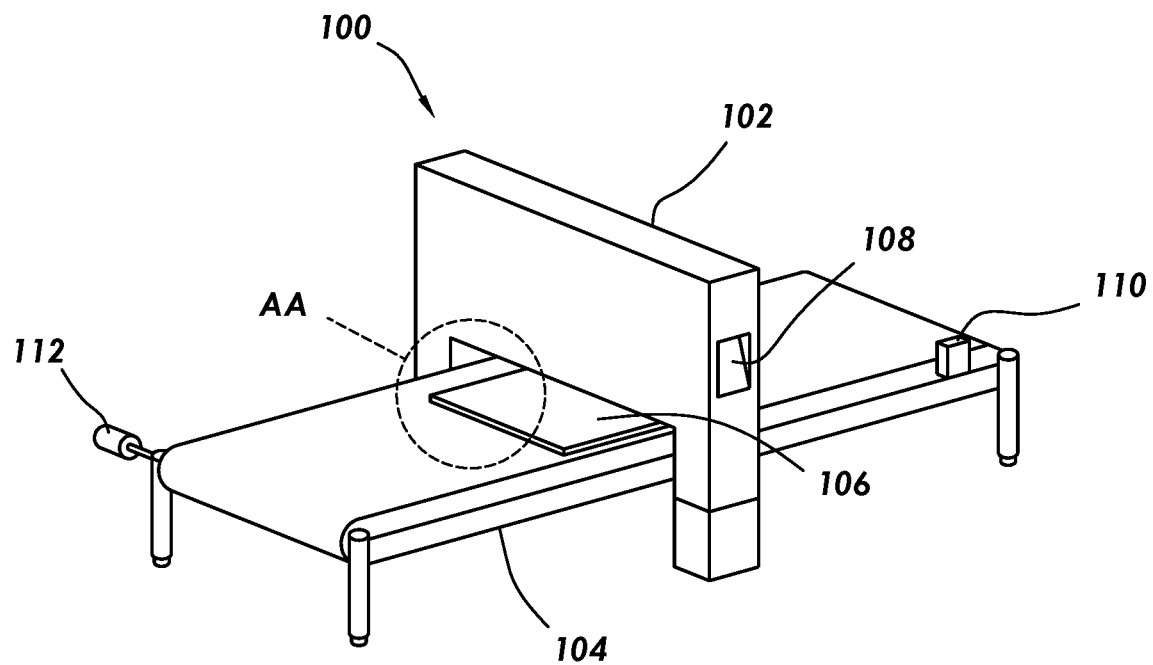
FIG. 1 shows an information capturing (scanning/photographing), sorting, and inspection system in accordance with the various aspects and embodiments of the invention.

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures (FIGs.), in which like numbers represent the same or similar elements.

Reference throughout this specification to "one embodiment," "an embodiment," or "in accordance with some aspects" and similar language means that a particular feature, structure, or characteristic described in connection with the various aspects and embodiments are included in at least one embodiment of the invention. Thus, appearances of the phrases "in accordance with an aspect," "in accordance with one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

The ranges of values provided herein do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In accordance with some aspects and embodiments of the invention, the upper frame is attached to a lower frame or a column foundation, which includes a conveyor belt or a roller that moves a slab, panel, or tile (SPT) through the upper frame at a constant speed, to obtain or capture uniform scans/photographs of the SPT. As used herein, SPT(s) includes a slab(s), panel(s), tile(s) made of stone, wood, and/or ceramic manufactured pieces or construction material, all in various dimensions and shapes. As used herein, the term capture includes any form of collecting or getting information that can be transferred or converted into images. For example, scanning or photographs. As used herein, the term "image" includes scans, photos, or still content from a video recording and term is used interchangeably therewith.

Referring now to FIG. 1, FIG. 3, FIG. 4, and FIG. 10, according to various aspects and embodiments of the invention, system 100 includes an image capturing device that collects information (the scanning/photographing), sorting, and inspection machine 102 and a conveyor belt 104 or roller bed 204. Underneath modules case 102, a standardized scanning/photographing system 400 built with standardized frame 302 (incorporating a computer 604, and Programmable Logic Control [PLC] and Arduino system 606 that are not shown), and a monitor 108 for operators' interactions. Attached to the conveyor belt 104 are the jet-ink printer or label printer 110 and an encoder 112.

The conveyor belt 104 or roller bed 204 moves SPT 106 through the standardized scanning/photographing system 400 at a constant speed. The encoder 112 sends pulses and distributes and synchronizes the data to all electronics to obtain clear standardized photos of the SPT 106. As used herein, data may include any one or combination of information such as color, color shade, pattern, and grade, and any sensor data.

Figure 2A:
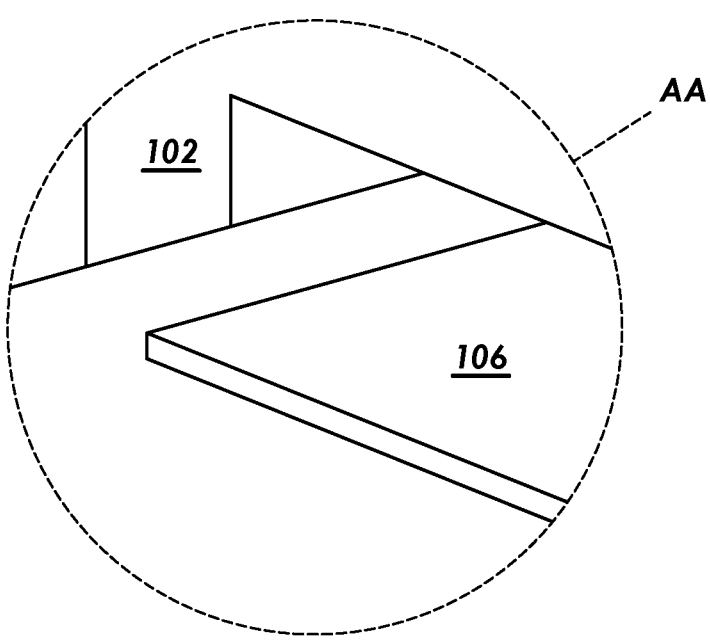
FIGS. 2A and 2B shows the details of the system of FIG. 1 in accordance with the various aspects and embodiments of the invention.

Referring now to FIG. 2A and FIG. 1, according to various aspects and embodiments of the invention, shows a magnified view of AA of FIG. 1. The figure shows an SPT 106 being moved by a conveyor belt 104. In this embodiment, the color of the conveyor belt is any of the three: green, blue or black as the background for scanning/photographing of the SPT 106. The color selection depends on the stone factory's production.

Figure 2B:
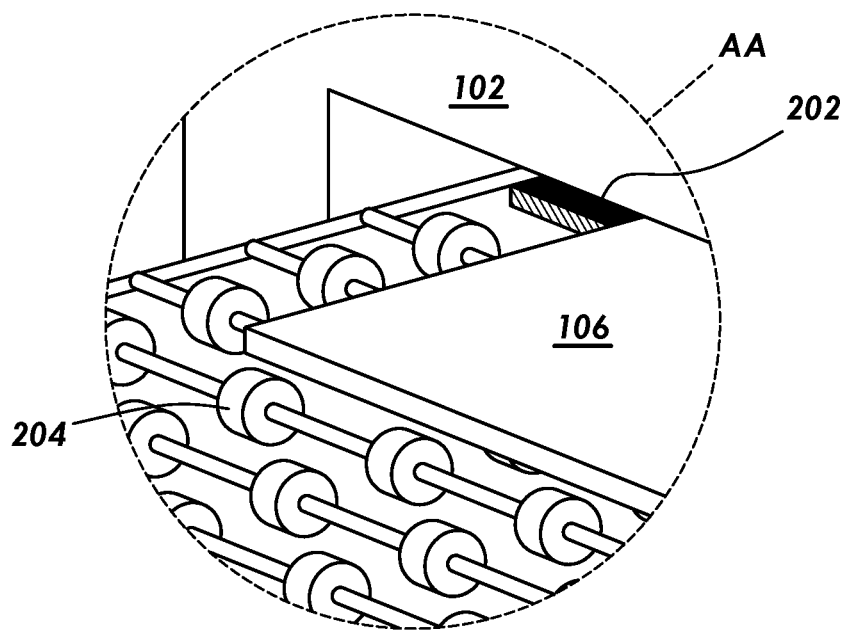
Figure 3:
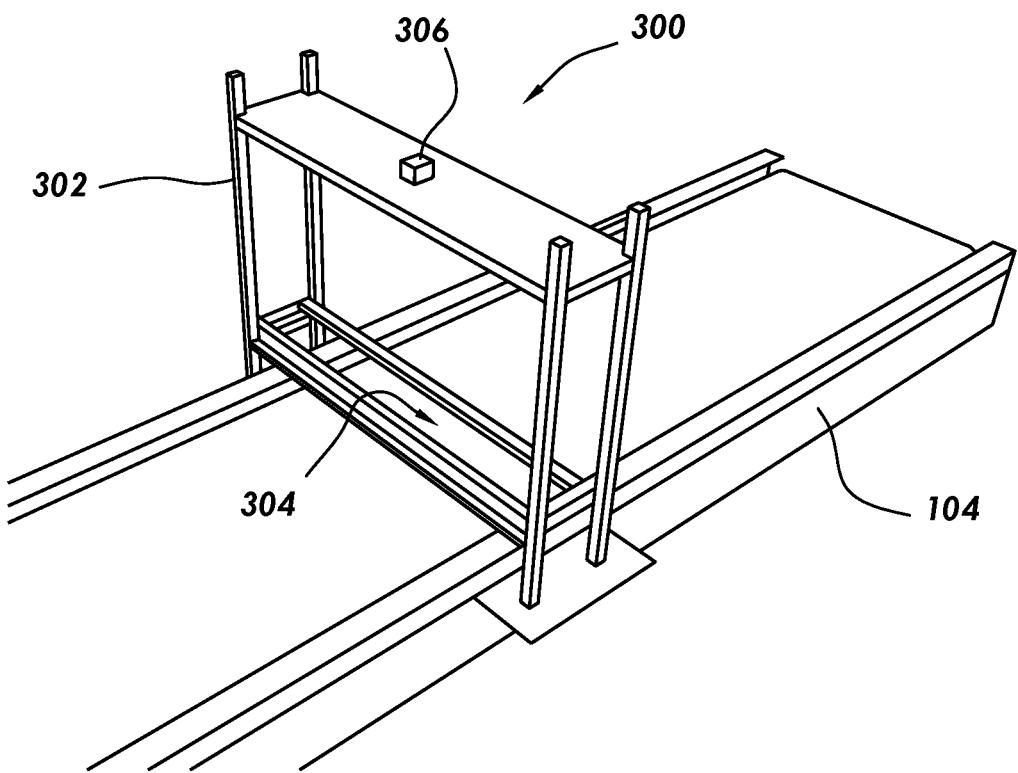
FIG. 3 shows the internal frame of the invention mounted on a conveyor belt of the system of FIG. 1 for uniform information capturing (scanning/photographing) in accordance with the various aspects and embodiments of the invention.

Referring now to FIG. 2B and FIG. 1, according to various aspects and embodiments of the invention, shows an alternative stone conveyance apparatus. This iteration includes a roller bed 204 instead of the conveyor belt 104 for moving the SPT 106 through the system 102. This iteration of the invention consists of a changeable color background 202. Each side of the color background 202 has a different color. A non-limiting example of a frame with four sides will have four different colors: green, blue, black, and red. This option allows the system operator to choose an appropriate background to obtain better color contrast for quality scans/photographs of the SPT 106. For example, in accordance with some embodiments, a green/blue background color is suitable for black stone products since a black background will make it difficult to see the photo. In one embodiment, the color background 202 automatically changes on the operator's demand from one color to other available colors.

Referring now to FIG. 3, FIG. 1, FIG. 2A and FIG. 4, according to various aspects and embodiments of the invention, a structure 300 includes an upper frame 302, which is enclosed within the upper module 102. In this instance, the lower module 104 supports the system and is the track for the conveyor belt 104. The upper frame 302 supports the components of the standardized scanning/photographing system 400, including a standardized and calibrated information collecting device 402 (e.g., a standardized and calibrated camera or scanner or video image recorder) located at frame position 306 for collecting information (e.g., images or photos or scans) about the surface of the SPT, the standardized light source 408 at 304, as well as the computer 604, and PLC and Arduino system 606 that are not shown. The term "information collecting device" is used interchangeably with camera, recorder, and scanner herein.

Now referring to FIG. 4, FIG. 3, FIG. 1, FIG. 2B, and FIG. 10, a side view of a detailed drawing 400 of the standardized upper frame 302 of the system 100 with a roller bed 204 is shown in accordance with various aspects and embodiments of the invention. The standardized upper frame 302 allows for controlled, repeatable, and consistent positioning of the scanning/photographing components including the lights 408 and the camera 402. In one embodiment, the light shines along path BB at 45 degrees. In one embodiment, camera 402 captures photos along path CC perpendicular to the surface of SPT. The upper frame 400 ensures that the distance between the camera 402 and the light source and the SPT 106 is the same throughout all photo capturing processes.

The camera 402 is a component of the system 100 in accordance with some embodiments. In accordance with some embodiments and aspects of the invention, the camera 402 is the same make and model with the same specifications to obtain standardized photos of the SPT 106. Each camera 402 is subjected to a flat field correction, white-balancing, color correction calibration with professional targets, and color grading. In accordance with some embodiments, the lens 404 is of the same make and model and with the same specifications across systems to provide quality focus and clarity in scanning/photographing of the SPT 106. The lens 404 is set at the same physical settings, for example, focal length, distance marking and aperture across all photo capturing situations by the system 100. In accordance with some embodiments, attached to the lens 404 are filters 406. In one embodiment, a filter that passes visible light (e.g., 405-690 nm) emitting infrared and ultra-violet rays is attached. In one embodiment, a protective filter from heat, dust, and impacts is attached. In accordance with some embodiments, the distance between the camera lens 404 and the SPT 106 is set to scan/photograph up to 1.1 meters. In accordance with some embodiments, due to the large slab size, a system taking standardized scans/photographs includes either two cameras separated or a camera with higher resolution. In accordance with some embodiments, in some systems with two cameras, the distance is set and designed, so that a width of 2.2 meters is scanned/photographed.

A standardized light source (lights) 408 for illuminating the SPTs and the color background aids in taking the standardized scans/photographs and is a component of system 100. The lights 408 are the same brand, type, and lumen. In accordance with some aspects and embodiments of the invention, the light source is a high-grade linear D65 LED with high +99CRI is used. In accordance with some embodiments, as the light intensity drops over time, there is a fail-safe method for detecting and alerting the operator that the light needs to be changed. Once a light source's illumination drops by a defined threshold level, for a non-limiting example, one percent, the embedded computer 604 sends a signal to alert that the light intensity has fallen and orders the system to stop capturing photos. The operator changes the ineffective light source to restore the lighting conditions, as produced by the light 408 to the required levels for scanning/photographing to resume.

The lights 408 illuminate the SPT 106 at the same instant the camera 402 scans/photographs SPT 106 passing under the camera(s) 402. The camera(s) 402 sends the photo for sorting and inspection on the same embedded computer 604 or the cloud server(s)'s compute module 614. The specifications of the SPTs 106 being scanned is sent to the jet-ink printer or label printer module 110 as a bar/QR code to be printed on the SPT 106. A jet-ink printer sprays the ink directly on the SPT. A label printer, prints on a label and then the label is attached on the SPT. Another label printer (not shown) prints bar/QR code labels that are attached to pallets/boxes 1006a-d for inventory management 608 of SPTs.

Figure 4:
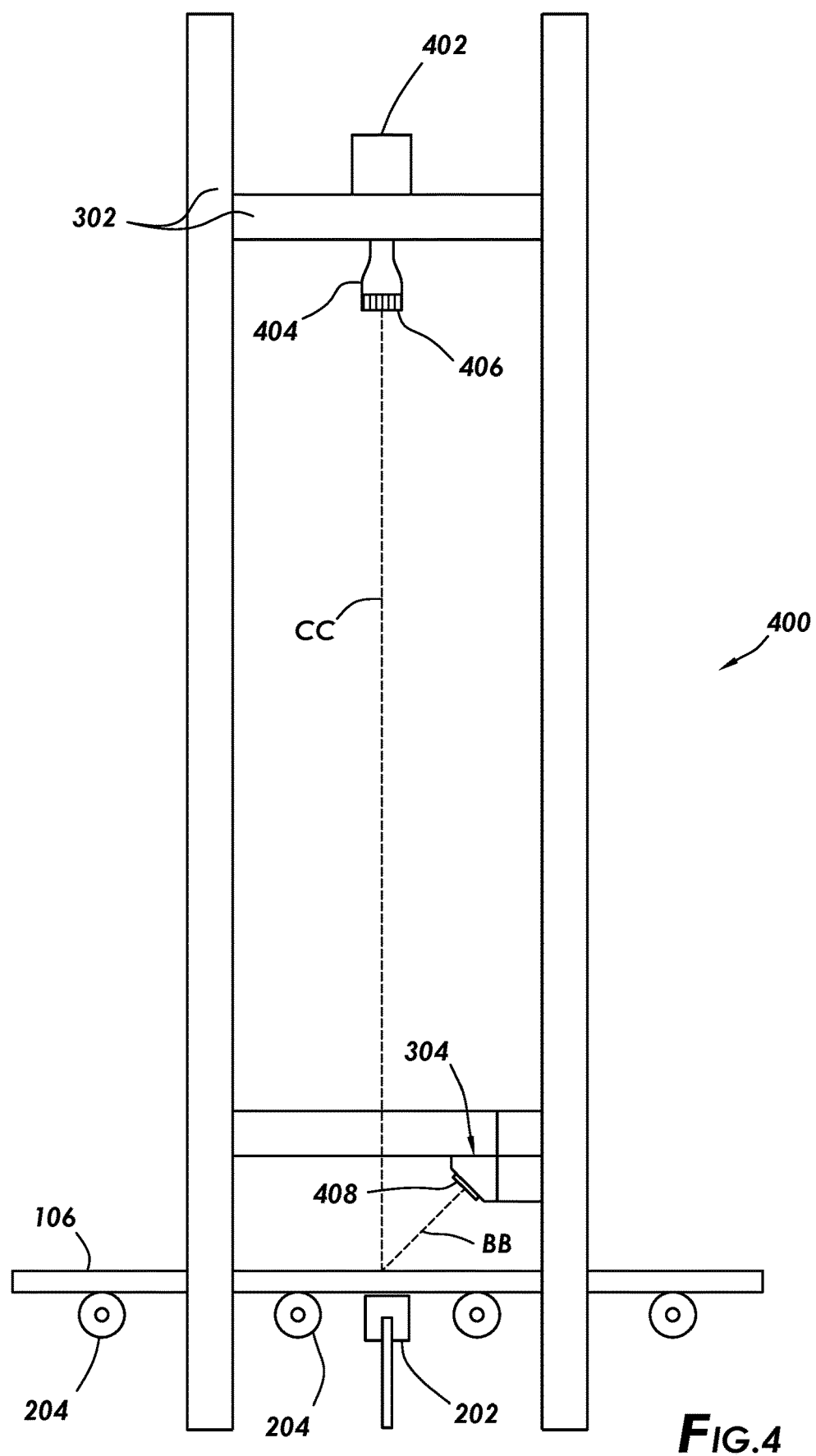
FIG. 4 is a side view that shows the detail of components of the internal frame of the sorting and inspection machine of FIG. 3 on a roller belt in accordance with the various aspects and embodiments of the invention.
Figure 5A:
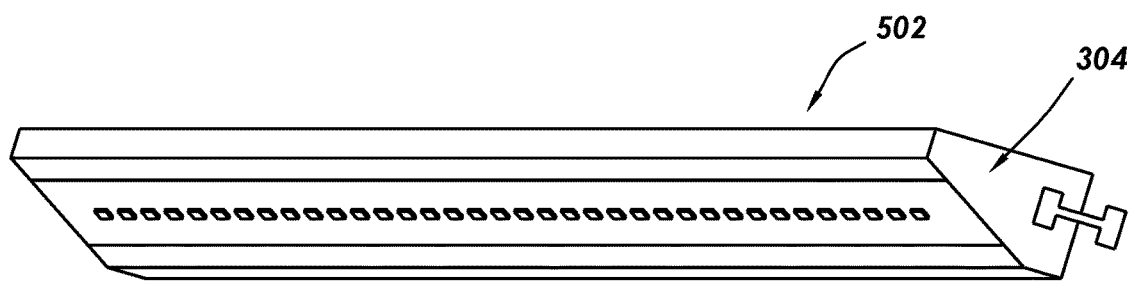
FIGS. 5A and 5B shows two versions of light source, either one of which may be used in the system of FIG. 1, in accordance with the various aspects and embodiments of the invention.
Figure 5B:
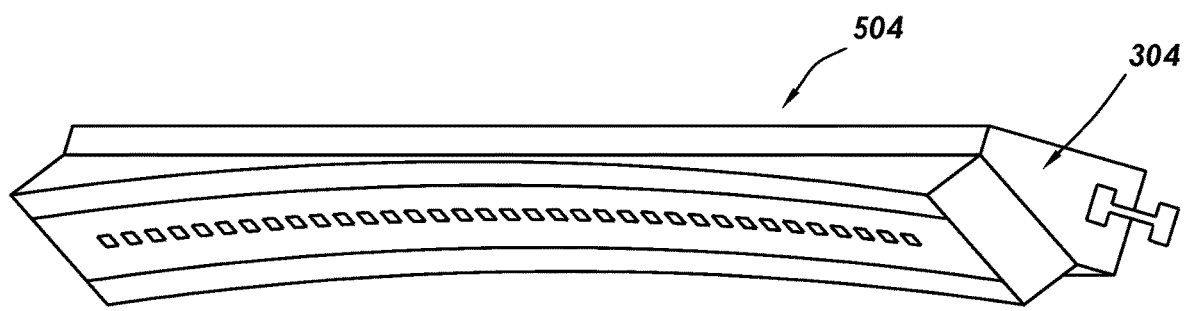

Now referring to FIG. 5A, FIG. 5B, and FIG. 4, according to various aspects and embodiments of the invention, lighting designs for the light 408 are shown. In accordance with some embodiments, light source 502 shows a row of lights in a straight-line design. In according to various aspects of the invention, the light source in straight-line configuration 502 could have higher lumen at the ends and lowers as it comes toward the middle giving a curved effect like the design 504. In accordance with some embodiments, light source 504 shows a curved design. The lighting in system 102 will use one of these configurations. In accordance with some aspects and embodiments of the invention, the systems and methods described herein can be manufactured, installed, and/or certified according to the process and systems disclosed herein. Thus, companies can use devices or equipment that implement, in whole or in part, systems and methods disclosed herein, which are considered certified devices or equipment.

The embedded computer 604 in 102 is tasked with storing and syncing photos of scanned/photographed SPTs 106 without modifications to the cloud server(s). It performs sorting and inspection on the SPTs if the capability is enabled or allowed by Standard Stone Inc, locally; if not, this will be performed on the cloud server(s), assigning bar codes and/or QR codes (attained locally or from the cloud) to each SPT 106.

Figure 6:
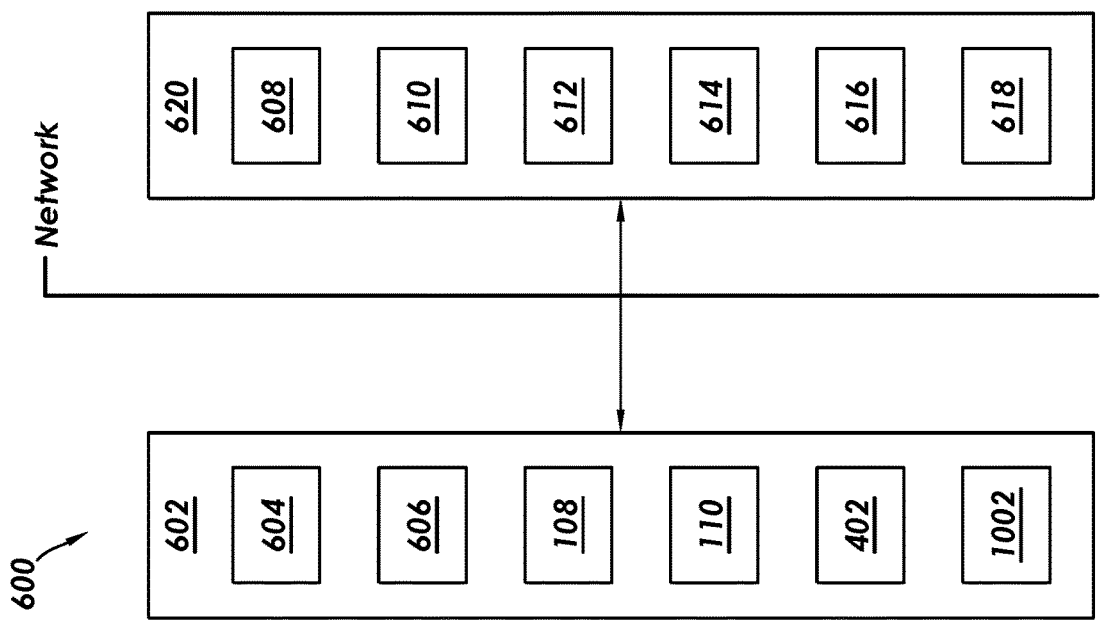
FIG. 6 is a block diagram of the connection between an operating system of the information capturing (scanning/photographing), sorting, and the inspection machine with its on-site/online web-applications and software in accordance with the various aspects and embodiments of the invention.

Now referring to FIG. 6, a block diagram of a system 600 is shown according to various aspects and embodiments of the invention, representing the interconnection between electronic modules of the system 100 and its software modules and web-applications. The system 600 includes: 1. The scanner and inspection machine electronics' 602 that is embedded inside 102. 2. Server(s) and cloud services 620.

The primary electronic components, which includes scanning/photographing, sorting, and inspection, of the system or machine is the embedded computer 604, programmable logic control (PLC) and Arduino 606, printer 110, camera(s) 402, monitor 108, and the QR/barcode scanner 1002. In accordance with some embodiments, the embedded computer 604 is part of the system 100 and is connected to the internet and a cloud service via any of the wired, wireless, or cellular router.

The embedded computer 604 is in communication with PLC and Arduino 606, transmitting data, tasks and categorizing and sending data to server(s). The PLC and Arduino system 606 are tasked with capturing sensor data, monitoring, and controlling the processes of the system 100. These tasks include monitoring and synchronizing the speed of the conveyor with the camera(s) 402 and the printer 110; detecting when a light 408 burns out or drops in lumen value below the ideal value; stopping the system and notifying the operator to replace the light 408; dust sensor to detect dust buildup on the camera lens 404 or filter 406 and alerting the operator to clean the lens 404 or filter 406; monitoring the system 100 for heat buildup (excess heat) and shutting off the system 100 if the internal temperature rises above a specified level; glossmeter to capture the glossiness along the SPTs; thickness sensor(s) to measure the thickness along the SPTs and to use proper scan setting for SPTs 106 of different thicknesses. Different thicknesses of the SPTs 106 slightly affect the color in the photos because the distance from the surface of the SPT to the camera 402 is changed; therefore, the automatic setting adjustment will ensure consistency The server(s) and cloud services 620 maintain the web-applications, software, modules 608-616, and database(s) 618. Stone factories can access all of these capabilities on their devices. In accordance with some aspects and embodiments of the invention, in the factory inventory management 608, the uniformly acquired photos of the SPTs are recorded by a system; and are sorted into matching color, color-shading, pattern, and grading which are cataloged by these types in this web-application. In addition, the web-application provides visualizations about statistics and stock management of factories' SPT production and stone blocks.

In accordance with some aspects and embodiments of the invention, the system maintains a web-based natural stone product store, e-commerce shop 610. Natural stone customers can search, filter, and view the SPTs in each pallet and box produced by every stone factory. Search criteria of filters can include, but are not limited to color, color-shade, pattern, dimension, thickness, stone type, type of finish, price, factory location, quarry name, country of origin, and many other filters. The e-commerce customer will select and order a complete pallet or box that will include stone products of the same quality throughout the pallet or box.

Customer relationship management (CRM) 612, is a web-application that helps the factories connect and communicate with the customers for tasks such as purchasing SPT or blocks from the e-commerce shop 610, financial duties, etc. For example, once the customer selects the pallets or boxes and completes a transaction, CRM 612 notifies the stone factory about the purchase and connects it with the factory inventory management 608. Each container's bar/QR are scanned by a bar/QR code scanner 1002 to identify the correct product selection. As used herein, container includes pallets, boxes, and any other means for shipping of materials.

The identified container bar/QR code information is sent to the system to ensure it matches the bar/QR code of the product the customer purchased. Then the order is processed and shipped or delivered to the customer. The revenue is shared based on the system receiving (e.g., Standard Stones Inc.) a percentage of the transaction. In some embodiments of the invention, an online customer order may be completed by shipping it from several different stone factories that use the same standardized stone product sorting system.

The computing module 614 performs sorting and inspection; this computation can be done in the embedded computer 604. Module 616 represents other web-applications and software typical or to be created, such as CNC cutting machine blueprints, 3D rendering, etc. The database(s) 618 stores all of the photos captured by the system 100, the sensor and IoT data for maintenance of the machine, etc. In accordance with some aspects and embodiments of the inventions, modules 602 and 620 communicate with one another.

According to some aspects and embodiments of the invention, stone factories can be charged a subscription fee for maintaining the inventory management system 608. Other services could have their subscription fee separately. Examples of these web-services are CRM, Slab Book-Matching, CNC Software, etc.

Figure 7:
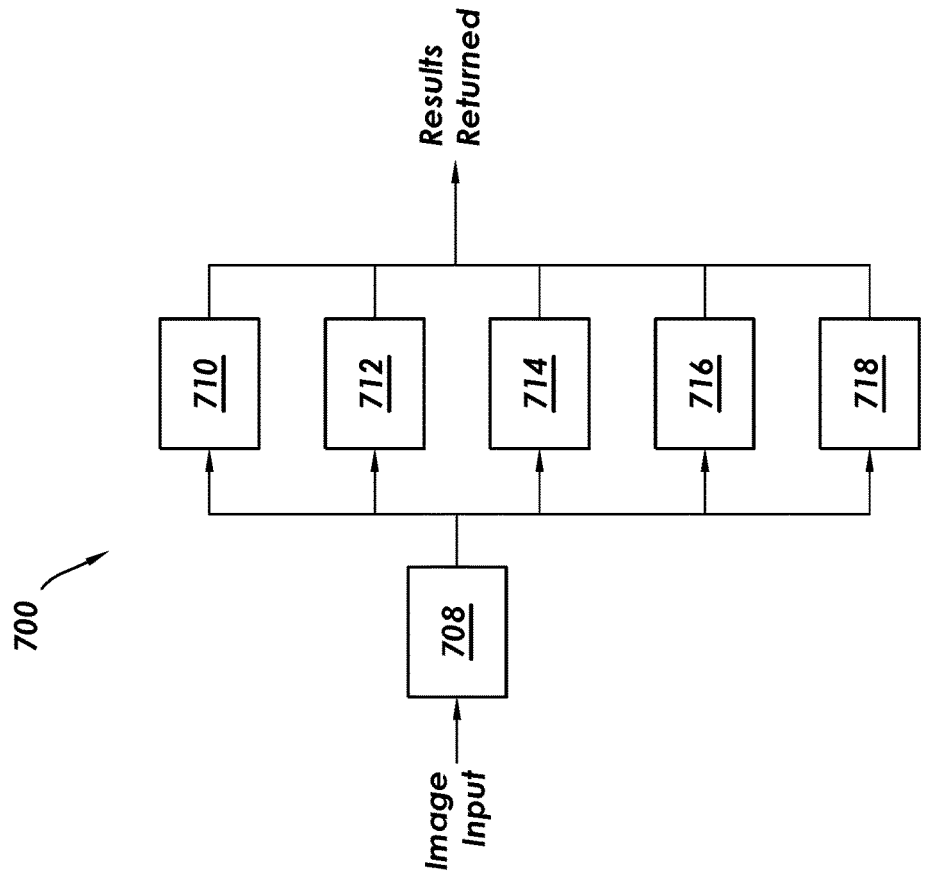
FIG. 7 shows a flowchart of the processes applied on the photo captured by the system of FIG. 1 and FIG. 6 in accordance with the various aspects and embodiments of the invention.

Now referring to FIG. 7, process 700 demonstrates the sorting and inspection steps for a photo of an SPT 106 applied by compute module 614 or embedded computer 604 according to various aspects and embodiments of the invention. Once the machine captures the photo, it is sent to the processing module on the embedded computer 604 or the cloud-based compute module 614. In the case of cloud-based computer, the local computer sends the photo to the cloud via the internet. The processor module performs several steps once it receives a photo. At step 708, the processing module uses object detection to crop the photo's background outputting only the photo of the SPT 106. The cropped photo is distributed to the following processing modules 710, 712, 714, 716, and 718. Module 710 computes the side measurements, diagonal measurements, total area, and effective area of the SPTs. Module 712 determines the primary color of the SPT (e.g., black, red, crema, etc.). The Color-Shading module 714 determines the shade variation (e.g., brightness to darkness level, color intensity) within the primary color of the SPT. The pattern recognition module 716 determines the pattern of the SPT. Grading module 718 determines the natural and processing imperfections of the SPT. According to various aspects and embodiments of the inventions, some of these sorting and inspection modules can be on-site while others are on the cloud with no limitation of variations. Once the on-site and/or cloud-based processing is finished on the photo, the system displays the results on the monitor, and sends the same data to the jet-ink printer or label-printer 110. The jet-ink printer prints these data along with QR/Bar codes on the side of the SPT. The label-printer prints these data along with QR/Bar codes on the label, and then the label is manually attached.

Figure 8:
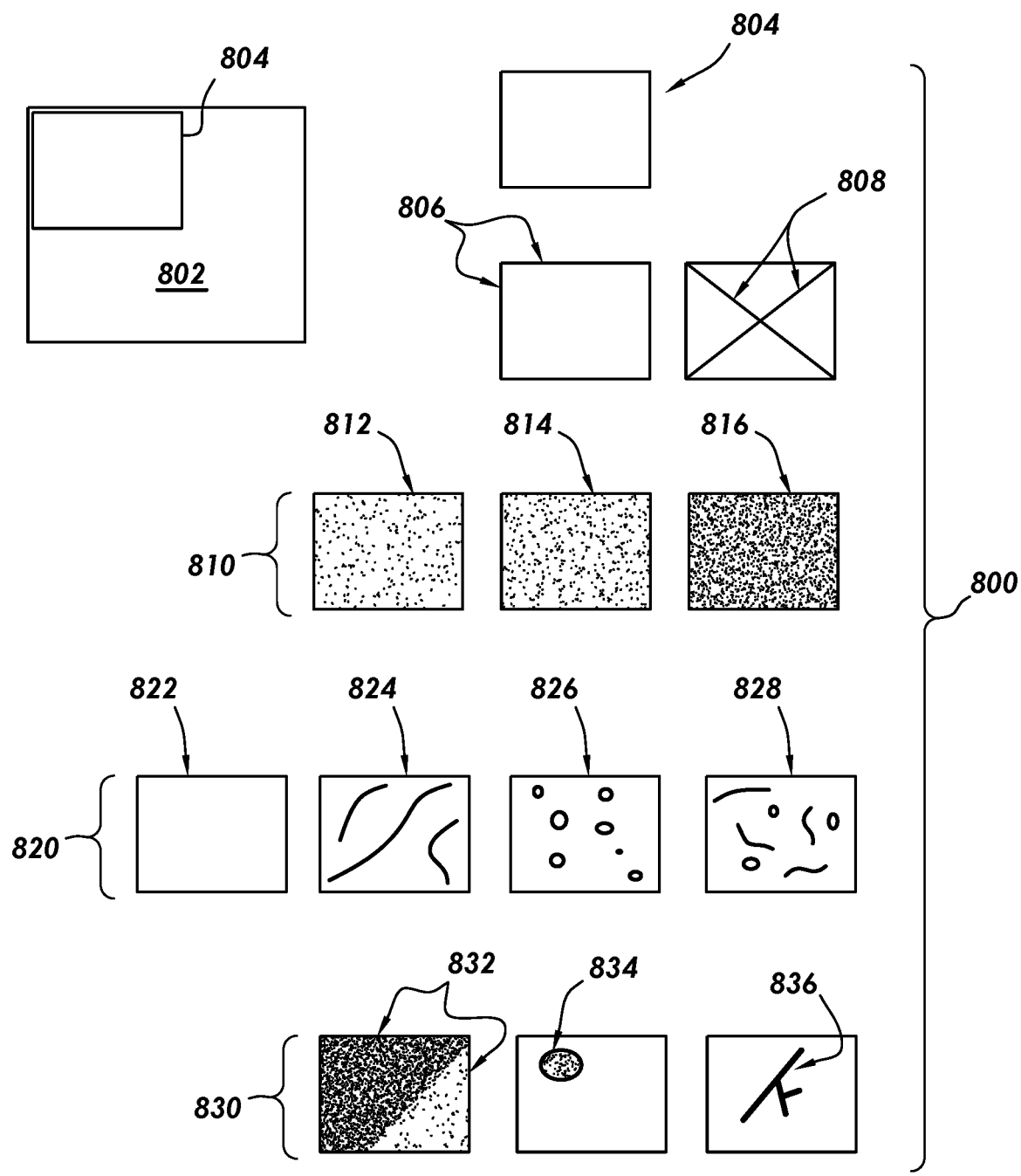
FIG. 8 shows the sorting and inspection capabilities by the processes of FIG. 7 in accordance with the various aspects and embodiments of the invention.

Now referring to FIG. 8, the sorting and inspection process in 700 is visually illustrated according to various aspects and embodiments of the invention. During the process 700, an original photo 802 is detected and cropped to produce cropped photo 804 by module 708. Module 710 gives the measurements 806, 808, total area, and effective area for inventory management and inspection control (e.g., perfect square or rectangular tiles).

In accordance with some aspects of the invention, the number of color-shading categories for module 714 can be set by the operator. In accordance with one non-limiting embodiment and aspect of the invention, 810 illustrates a simplified example where three color-shading categories are chosen. The left image 812 shows a lighter shade of a specific color of SPT; the middle image 814 shows a medium shade of the same color; and the right image 816 shows a darker shade of the same color SPT.

In accordance with some aspects of the invention, the cropped photo 804 is fed to the pattern recognition module 716 to determine the pattern(s). In accordance with one non-limiting embodiment and aspect of the invention, four categories of the patterns are shown by 820. In this non-limiting example, photos of SPTs are sorted into plain (no pattern) 822, veining and shading patterns 824, dotted patterns 826, and a combination of veining and dotted patterns 828.

In accordance with some aspects of the invention, the photos are graded according to imperfection and defects of quality 830 by the grading module 718. In this non-limiting example, there is a grading with the inconsistency of color 832, natural/processing defect 834, and natural cracks 836. All of these imperfections negatively impact the desirability and the value of the actual SPTs shown by these images, which directly impacts pricing.

Figure 17:
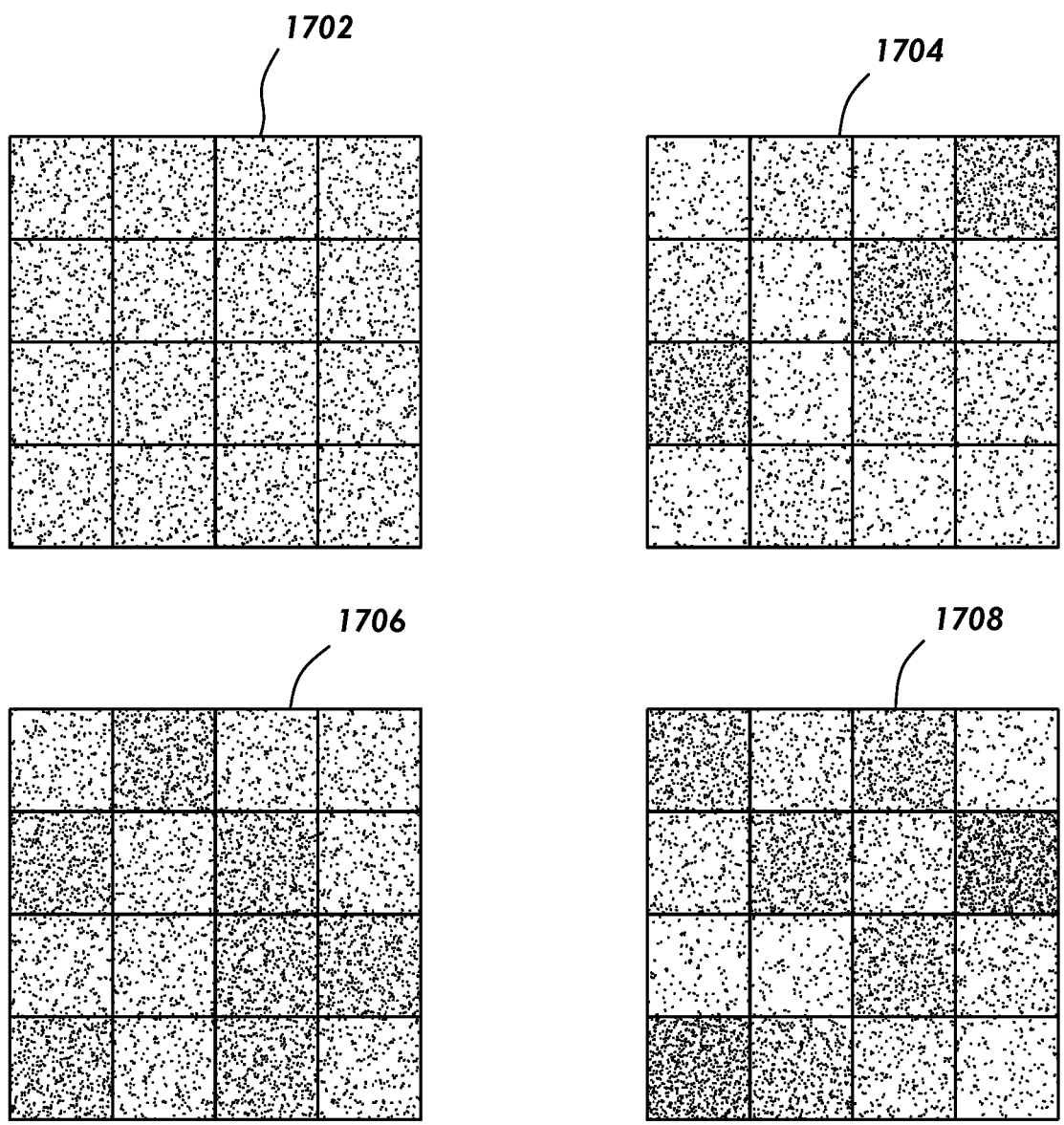
FIG. 17 shows the color-shading variations in accordance with various aspects and embodiments of the invention.

Now referring to FIG. 17, according to various aspects and embodiments of the invention, shows color-shading variations when SPTs are installed. The color-sorting module 714 attains the uniform appearance 1702. Stone factories with sorting specialists attain color-sorting with slight variation 1704, where the differences in color-shade are distinguishable. Factories that encounter workers with a lack of experience, negligence of workers, weather changes, etc., attain moderate variation 1706. In the moderate variation, the differences in color-shading vary by multiple shades. Substantial variation 1708 happens when a stone factory has no workers dedicated to sorting, and all SPTs are just piled or stacked in a container. This type of variation is sold very cheaply due to shade variation.

Figure 9:
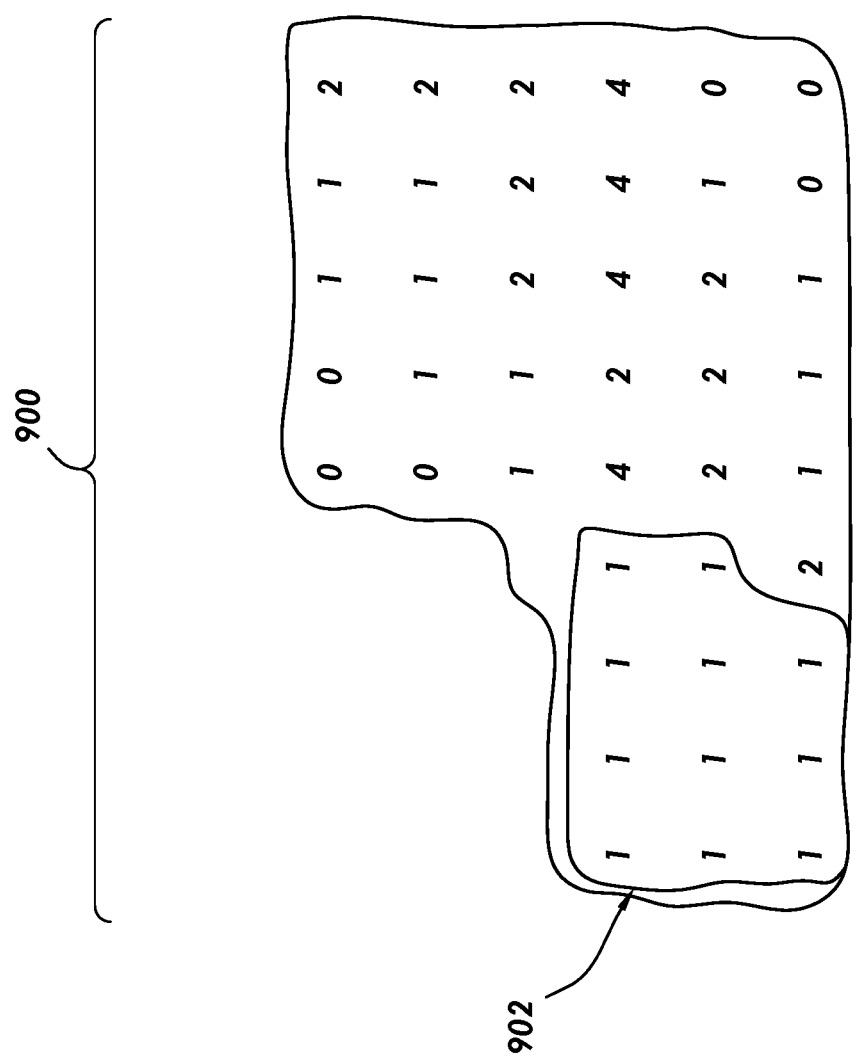
FIG. 9 shows a secondary method for sorting and inspecting SPT in accordance with the various aspects and embodiments of the invention.

Now referring to FIG. 9, according to various aspects and embodiments of the invention, another method to perform color-sorting, pattern, and grading on the SPTs, slab in this example, is to divide it into smaller grids and get the category for each grid individually, as opposed to getting one category for the whole slab. Modules 710-718 determines the results for each grid of the slab 900 and display them on monitor 108.

Areas like 902 have the same color-shading and quality characteristics; therefore, these grids can be cut into pieces of tiles or panels with similar appearance or aesthetic quality. This method is beneficial when the slab has inconsistency in color, allowing the operator to easily observe the difference, which directly impacts how the slab is later cut into tiles. For example, the system 100 can then use the assigned numbers to identify the measured areas with the same number and cut those areas into smaller portions for better quality and consistency than is typically obtained. The better-quality pieces thus produced, fetch a higher price in the marketplace, and generate more income for the stone factory.

The operators can use the touchscreen monitor 108 to apply markings to the photo. Marking options to highlight natural or processing defects can include but are not limited to: cracks, sawing defects, polishing defects, filling (resin, epoxy, etc.) defects, holes, etc. The monitor also displays all of the data gathered by different machine components to the operator; daily production statistics, categorization results from computing module 614, machines operational sensor data, quality control (QC) sensor data, etc. For QC sensor data, the monitor displays the thickness and glossiness level along the SPT, reporting the quality of the sawing machine and polishing machine. The factory can use this information to optimize or fix their sawing or polishing machine accordingly.

In accordance with some aspects and embodiments of the invention, the system for photographing/scanning, categorizing, and inventory management of stone products as described herein can be used throughout the stone industry to standardize these processes for SPTs in factories around the globe. Therefore, customers can order SPTs with confidence relying on the photos, and that the installed product will look uniform, even if the SPTs that make up their order are from one factory or different factories.

According to some aspects and embodiments of the invention, microtransaction billing is established where the system owner (e.g., Standard Stones Inc) charges the stone factory for each SPT, square footage, or square meter the system 100 scans, and compute module 614 categorizes for the stone factory. The system assesses or charges microtransactions to purchasers, lessees or other users of the system according to the number of tasks the system performs for the purchaser, lessee or other user. The system assesses or can charge microtransactions to customers, lessees, or other users who use the system's inventory management system. For example, when someone purchases a product from e-commerce website, part of the fees for (percentage of) the transaction (purchase) is allocated to the system. An e-commerce site is operated and enabled, which is in accordance with the various aspects and embodiments of the invention, for systems that are in operation at various locations or companies that have deployed the system. The images are accessible through the e-commerce shop. Buyers access the site and buy products. The respective company selling the product is notified of the sale and fulfills or delivers the goods. Funds are delivered or sent to the company delivering the goods and a portion of the funds from the sale of the goods are kept by the e-commerce site operator.

Figure 10:
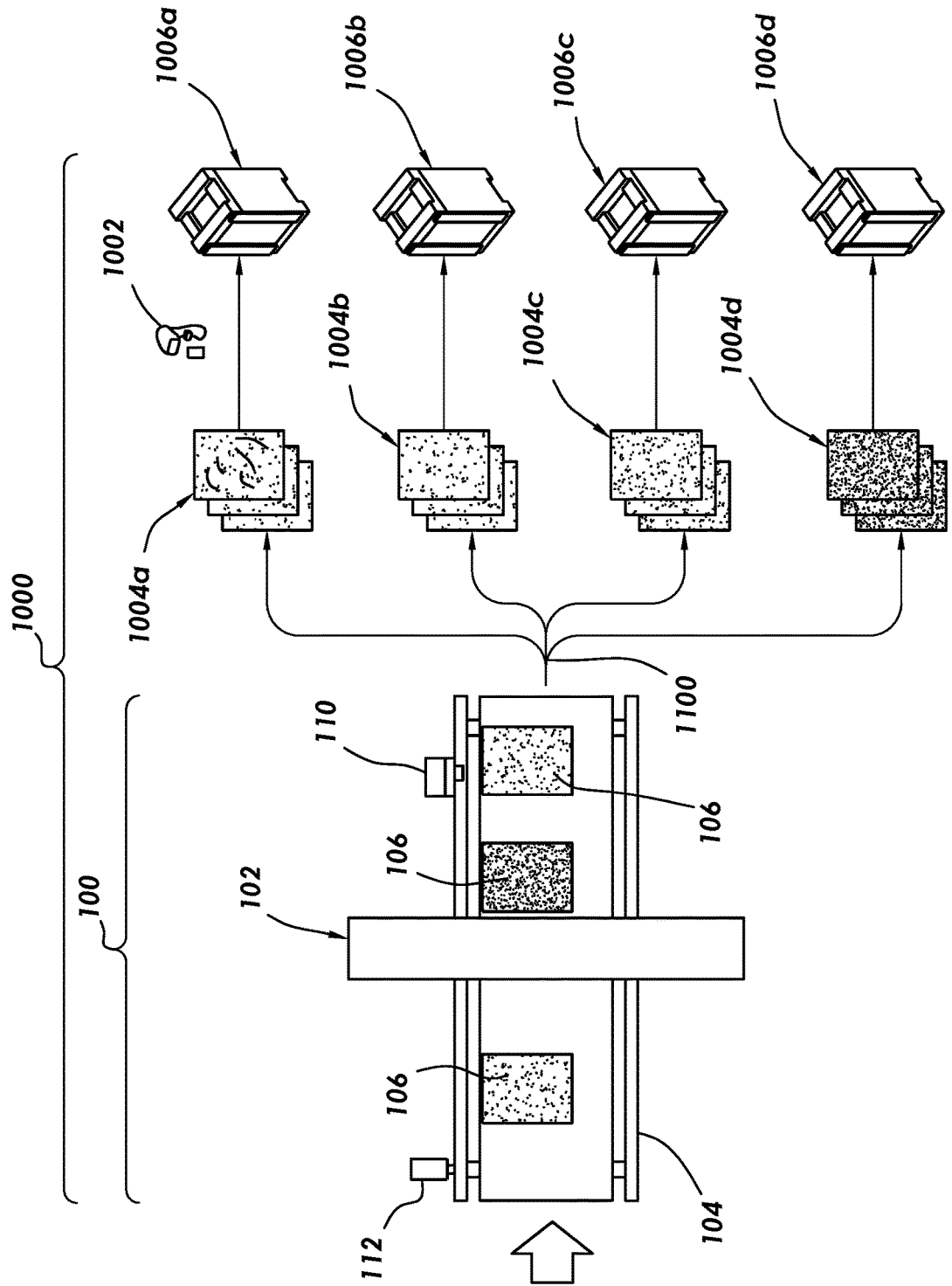
FIG. 10 shows a top view of a system, showing information capturing, sorting and inspection process from insertion into the system through packaging for inventory management and sales in accordance with the various aspects and embodiments of the invention.

Now referring to FIG. 10, an inventory management system 1000 is shown according to various aspects and embodiments of the invention. The figure shows system 100 with a conveyor belt where tiles are being sorted and inspected. In accordance with some aspects of the invention, once the results are printed, or the adhesive label is attached to the SPT, the worker or robot has to place them in their pallets/boxes 1006a, 1006b, 1006c, 1006d according to the results from sorting and inspection modules. For a non-limiting example, stack 1004a-d shows that groups of tiles or slabs are different, where for example, 1004a and 1004b are the same color-sort but have different patterns of plain and veiny, respectively. In accordance with some embodiments and aspects of the invention, the inventory management system 608 generates a unique bar code(s) or QR code(s) label for each SPTs, which is then attached or printed on edge thereof, typically on the thickness side or the face of the SPT. In accordance with some aspects of the invention, another label or commercial printer (not shown) prints a unique QR/Bar code for each pallet/box and is attached. After a pallet/box is filled with tiles or slabs, the worker uses the barcode reader 1002 to assign the tiles or slabs to that specific pallet/box.

When labels are printed for the container, the system uses the label's associated with each SPT (scanned as the product is placed in the container) and associates or assigns the SPT related information (items placed in the container) with the container label or code. This can be done, in accordance with some aspects, manually: each SPT is scanned with hand scanner as it is placed in the container. In accordance with some embodiments, the SPT information is scanned automatically as automation robotic or machinery move the SPTs to the container. Thus, using a barcode scanner, the SPT's printed identification label (on the back surface of the SPT for example) is assigned to or associated with the container's identification label (the barcode or the QPR code). This advanced inventory management allows the stone factory to track and locate every pallet/box and its products inside; this is used later for shipment tracking. In accordance with some aspects of the invention, this tracking allows stone customers to see the SPTs in every pallet/box on the e-commerce website, allowing customers to know exactly what they are buying and thereby enhancing their shopping experience.

Figure 11:
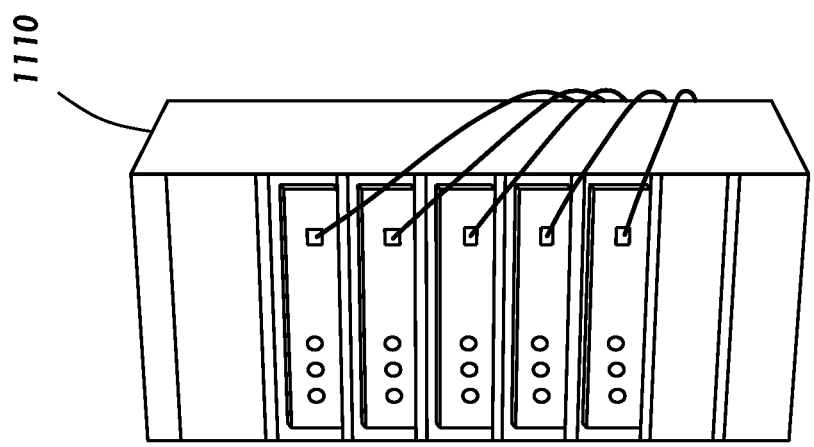
FIG. 11 shows a server in accordance with various aspects and embodiments of the invention.

Referring now to FIG. 11, a rack-based server system 1110 is shown, as implemented in various embodiments and as a component of various embodiments. Such servers are useful as source servers, publisher servers, remote servers, cloud-based computer system servers, and servers for various intermediary functions.

Figure 12:
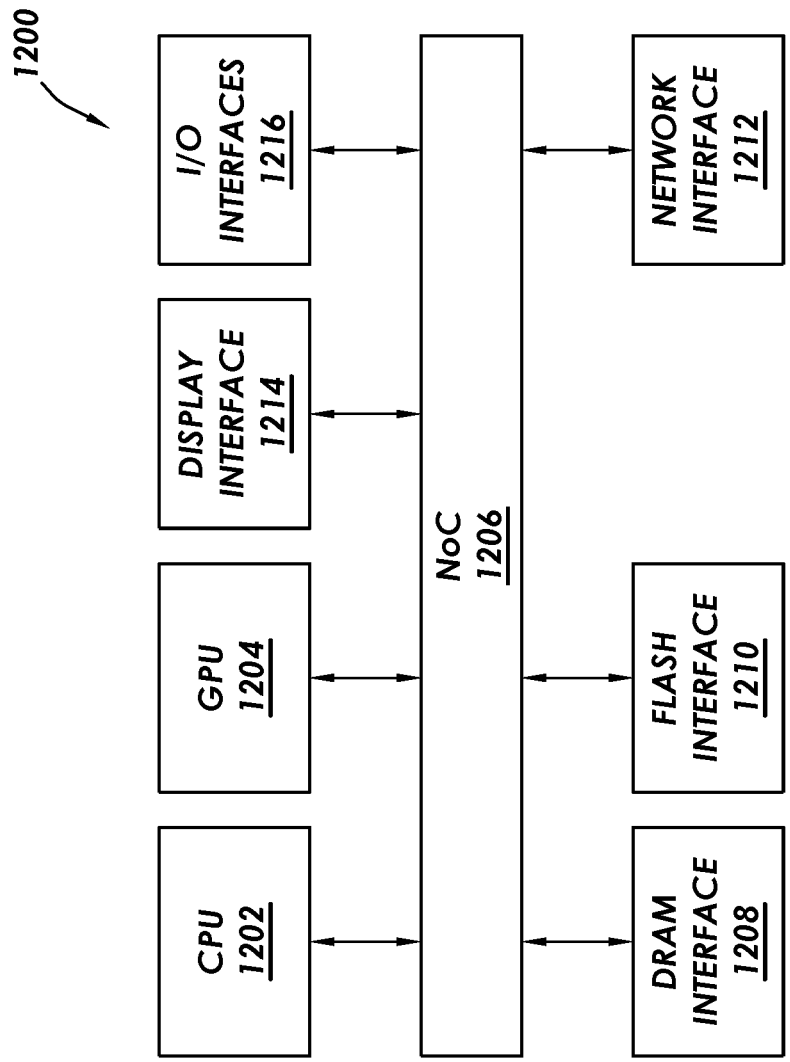
FIG. 12 shows a block diagram of a system-on-chip (SoC) in accordance with various aspects and embodiments of the invention.

Referring now to FIG. 12, a system-on-chip (SoC) 1200 that can be used to implement the various components of the system 100 (shown in FIG. 1) in accordance with the various aspects and embodiments of the invention. The SoC 1200 includes a multi-core computer processor (CPU) 1202 and a multi-core graphics accelerator processor (GPU) 1204. The CPU 1202 and GPU 1204 are connected through an interconnect or a network-on-chip (NoC) 1206 to a DRAM interface 1208 and a Flash RAM interface 1210. A display interface 1214 controls a display, enabling the system to output Motion Picture Experts Group (MPEG) video and Joint Picture Experts Group (JPEG) still image message content. An I/O interface 1216 provides for speaker and microphone access for the human-machine interface of a device controlled by the SoC 1200. A network interface 1212 provides access for the device to communicate with remote providers, servers, and computers using transceivers or wireless or wired communication to remote servers over the internet.

Figure 13:
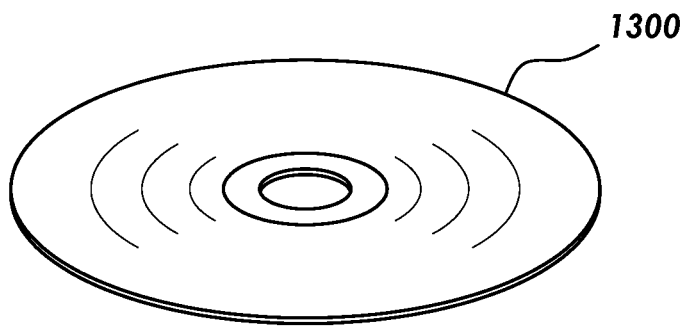
FIG. 13 shows a rotating disk non-transitory computer readable medium, in accordance with various aspects and embodiments of the invention.

Referring now to FIG. 13, a non-limiting example of a non-transitory computer readable rotating disk medium 1300 is shown. The medium 1300 stores computer code that, if executed by a computer processor, would cause the computer processor to perform methods or partial method steps described herein in accordance with various aspects of the invention.

Figure 14:
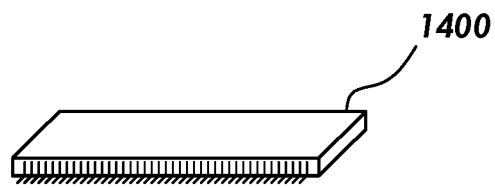
FIG. 14 shows a flash random access memory non-transitory computer in accordance with various aspects and embodiments of the invention.

Referring now to FIG. 14, a non-transitory computer readable Flash random access memory (RAM) chip medium 1400 is shown. The medium 1400 stores computer code that, if executed by a computer processor, would cause the computer processor to perform methods or partial method steps described herein in accordance with various aspects of the invention.

Figure 15:
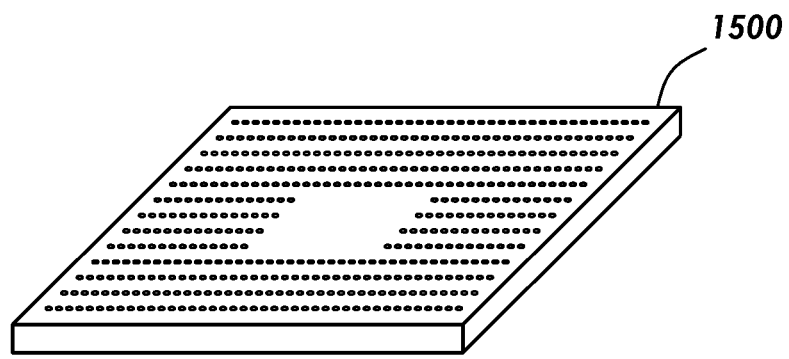
FIG. 15 shows the bottom side of a computer processor based SoC in accordance with various aspects and embodiments of the invention.

Referring now to FIG. 15, a bottom side of a packaged system-on-chip (SoC) 1500 is shown. The SoC 1500 includes multiple computer processor cores that have a component of some embodiments and that, by executing computer code, perform methods or partial method steps described herein in accordance with various aspects of the invention.

Figure 16:
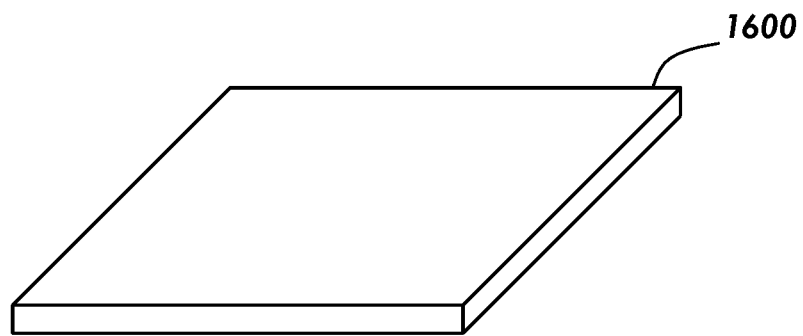
FIG. 16 shows the top side of a computer processor based SoC in accordance with various aspects and embodiments of the invention.

Referring now to FIG. 16, a top side 1600 of the SoC 1500 (FIG. 15) is shown in accordance with various aspects and embodiments of the invention.

Some embodiments of the invention are cloud-based systems. They are implemented with, and controlled by, a server processor, FPGA, custom ASIC, or other processing device. Such systems also comprise one or more digital storage media such as a hard disk drive, flash drive, solid-state storage device, CD-ROM, floppy disk, or box of punch cards.

Some embodiments access information and data from remote or third-party sources. Cloud-based embodiments have network interfaces that interact with network endpoint devices such as mobile phones, automobiles, kiosk terminals, and other voice-enabled devices.

Embodiments of the invention described herein are merely exemplary, and should not be construed as limiting of the scope or spirit of the invention as it could be appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future.

The behavior of either or a combination of humans and machines (instructions that, if executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines, such as semiconductor chips; hardware description language representations of the logical or functional behavior of machines according to the invention described and claimed; and one or more non-transitory computer readable media arranged to store such hardware description language representations all can embody machines described and claimed herein.

In accordance with the teachings of the invention, a system, a computer, and a device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

Article of manufacture (e.g., computer, system, or device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

The scope of the present invention, therefore, is not intended to be limited to the exemplary embodiments shown and described herein. Rather, the scope and spirit of present invention is embodied by the appended claims.

What is claimed is:

1. A system for capturing information related to a slab, panel, or tile (SPT) surface made of a natural material, the system comprising:
   an information collecting device for collecting information about the SPT surface;
   a light source for illuminating the surface, wherein the light source is a high-grade light emitting diode (LED) that operates above a threshold illumination;
   a frame for consistent positioning of the information collecting device and the light source relative to the surface;
   a conveyor system secured to the frame for controlled and precise movement of the SPT past the information collecting device and the light source at a consistent speed, wherein the information includes photos that are captured under controlled conditions resulting from combined use of the light source, the frame, and the conveyor system; and
   a processor in communication with the information collecting device for analyzing the information about the SPT to standardize the photos for uniformity and to categorize the information for the SPT based on defined categories, wherein the processor monitors illumination of the light source so that when illumination of the light source drops below the threshold illumination, then the processor generates a signal to indicate illumination of the light source has fallen below the threshold illumination.

2. The system of claim 1 further comprising a printer for printing data related to the information categorized by the processor, wherein the printer is in communication with the processor.

3. The system of claim 1 further comprising a monitor for viewing categorization data for information about the surface, wherein the monitor is in communication with the processor.

4. The system of claim 1 further comprising an encoder to accurately synchronize the conveyor speed with the information collecting device's rate of capturing information.

5. The system of claim 1 further comprising a background for providing contrast to the surface while the information collecting device collects information.

6. A non-transitory computer readable medium for storing code that is executed by a system's processor to cause the system to:
   synchronize speed of a conveyor with an information collecting device's rate of capturing photos, wherein the information collecting device captures each photo at a specific instant of time of a portion of a natural slab, panel, or tile (SPT) surface region and wherein the information collecting device ensures consistency between each photo with respect to at least one of a flat field correction, white-balancing, color correction calibration, and color grading while having the surface region is illuminated using a high-grade light emitting diode (LED) light source that operates above a threshold illumination;
   generate an alert signal if the illumination of the light source falls below the threshold illumination;
   crop the captured photos to eliminate unwanted background portions in the captured photo and produce a cropped image;
   analyze and sort the cropped image according to at least one of dimensions, diagonals, area, color, color-shade, pattern and grade of the SPT; and
   generate a chart that indicates an identifier for the SPT's surface region.

7. The non-transitory medium of claim 6, wherein the identifier for the SPT's surface region is based on features including:
   color of the surface;
   color-shade of the surface;
   pattern of the surface; and
   grade of the surface,
   wherein the identifier for the SPT's surface regions with similar color, shade, pattern and grade is identical.

8. The non-transitory medium of claim 6 including further code that is executed by the system's processor to cause the system to show at least some captured photos on a monitor.

9. The non-transitory medium of claim 6 including further code that is executed by the system's processor to cause the system to print data about the captured photos on adhesive labels that are affixed to the SPT or directly on a surface of the SPT, wherein the print data indicates the color, color-shade, pattern and quality of the surface.

10. The non-transitory medium of claim 6 including further code that is executed by the system's processor to cause the system to calculate the measurements of the SPT's surface in the cropped photos.

11. The non-transitory medium of claim 6, wherein the information collecting device is a camera and including further code that is executed by the system's processor to cause the system to monitor and alert an operator if excess dust is detected on a camera lens.

12. The non-transitory medium of claim 6 including further code that is executed by the system's processor to cause the system to print labels for a plurality of containers and assign the SPT's coded label to the label of a container receiving the SPT that is placed in the container.

13. The non-transitory medium of claim 12 including further code that is executed by the system's processor to cause the system to shut the system down when excess heat accumulates within the system.

14. The non-transitory medium of claim 12 including further code that is executed by the system's processor to cause the system to alert the operator and shut down the system when the intensity of the systems lights drops below optimal intensity.

15. The non-transitory medium of claim 12 including further code that is executed by the system's processor to cause the system to manage an inventory control system according to identification information associated with the SPTs.

16. The non-transitory medium of claim 15 including further code that is executed by the system's processor to cause the system to manage inventory by associating identifiers of the SPTs with a container's identification code when the SPTs are placed in the container.

17. The non-transitory medium of claim 6 including further code that is executed by the system's processor to cause the system to send inventory management data to an e-commerce site where the SPTs are sold.

18. The system of claim 5, wherein the background can be modified into different colors based on the contrast needed relative to the SPT's color.

19. The system of claim 5, wherein the background is positioned by the frame for consistency between photos.

\* \* \* \* \*